US012389163B2

(12) United States Patent
Huang et al.

(10) Patent No.: US 12,389,163 B2
(45) Date of Patent: Aug. 12, 2025

(54) MULTIFUNCTIONAL SOUND DEVICE

(71) Applicant: AAC Technologies (Nanjing) Co., Ltd., Nanjing (CN)

(72) Inventors: Xingzhi Huang, Nanjing (CN); Wei Song, Nanjing (CN); Jie Ma, Nanjing (CN); Lubin Mao, Nanjing (CN); Yun Tang, Nanjing (CN); Ziang Li, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 298 days.

(21) Appl. No.: 18/337,419

(22) Filed: Jun. 19, 2023

(65) Prior Publication Data

US 2024/0205607 A1 Jun. 20, 2024

Related U.S. Application Data

(63) Continuation of application No. PCT/CN2022/144409, filed on Dec. 31, 2022.

(30) Foreign Application Priority Data

Dec. 19, 2022 (CN) ......................... 202211634571.1

(51) Int. Cl.

| | |
|---|---|
| ***H04R 9/02*** | (2006.01) |
| ***H04R 1/02*** | (2006.01) |
| ***H04R 7/04*** | (2006.01) |
| ***H04R 7/18*** | (2006.01) |
| ***H04R 9/04*** | (2006.01) |
| ***H04R 9/06*** | (2006.01) |

(52) U.S. Cl.

CPC ............. *H04R 9/025* (2013.01); *H04R 1/025* (2013.01); *H04R 7/04* (2013.01); *H04R 7/18* (2013.01); *H04R 9/046* (2013.01); *H04R 9/06* (2013.01); *H04R 2400/11* (2013.01)

(58) Field of Classification Search

CPC .......... H04R 9/06; H04R 9/025; H04R 9/046; H04R 2400/11

See application file for complete search history.

(56) References Cited

U.S. PATENT DOCUMENTS

2023/0100237 A1* 3/2023 Xiao ....................... B06B 1/045 381/412

FOREIGN PATENT DOCUMENTS

CN 115567850 A * 1/2023 ............... H04R 9/06

* cited by examiner

*Primary Examiner* — Sunita Joshi

(74) *Attorney, Agent, or Firm* — Wiersch Law Group

(57) ABSTRACT

A multifunctional sound device includes a housing, a sound unit, and a motor assembly. The sound unit includes a frame, a vibration system, a magnetic circuit system, and a first elastic component. The vibration system includes a vibrating diaphragm and a a voice coil. The voice coil drives the vibrating diaphragm to vibrate and generate sound along a first direction. A first end of the first elastic component is fixed to the frame. A second end of the first elastic component is elastically connected to the magnetic circuit system. The voice coil drives the magnetic circuit system to vibrate along the first direction. A mounting groove is defined on the magnetic circuit system. The motor assembly includes a stator and second elastic components. The stator is fixed to the housing. The stator is spaced apart from the magnetic circuit system and drives the magnetic circuit system to vibrate.

10 Claims, 5 Drawing Sheets

MULTIFUNCTIONAL SOUND DEVICE

TECHNICAL FIELD

The present invention relates to a field of electroacoustic conversion, and in particular to a multifunctional sound device for electronic speakers.

BACKGROUND

With advent of the mobile Internet era, the number of intelligent mobile equipment continuously rises. Among various intelligent mobile equipment, there is no doubt that mobile phones are the most common and the most portable mobile terminal equipment. At present, the mobile phones have a variety of functions, such as a high-quality music playing function and a vibration function. Therefore, multifunctional sound devices having the vibration function and sound playing function are widely applied to current intelligent mobile equipment.

A conventional multifunctional sound devices in the prior art includes a housing, a sound unit, and a motor assembly. The sound unit and the motor assembly are accommodated in the housing. The sound unit includes a frame, a vibration system, and a magnetic circuit system. The vibration system and the magnetic circuit system are respectively fixed on the frame, and the magnetic circuit system defines a magnetic gap. The motor assembly is attached to one side, away from the vibration system, of the magnetic circuit system.

However, in the prior art, the sound unit and the motor assembly in the conventional multifunctional sound devices are independently controlled. Since the motor assembly is disposed below the sound unit, a thicknesses of the conventional multifunctional sound devices is increased, and the conventional multifunctional sound device is difficult to be light and thin. Moreover, a magnet of the sound unit and a magnet of the motor assembly are not on the same plane, and magnetic field driving forces of the sound unit and the motor assembly interfere with each other and affect each other, so that there is a large number of the magnets in the conventional multifunctional sound device, making the conventional multifunctional sound device large in volume and making it difficult for the conventional multifunctional sound device to be miniaturized, thereby resulting in poor acoustic performance and poor vibration performance of the conventional multifunctional sound device. In addition, in the prior art, a vibration direction of the conventional multifunctional sound device is generally perpendicular to a vibration direction of the vibrating diaphragm of the sound unit, which only achieves vibration in one direction.

Therefore, it is necessary to provide a multifunctional sound device to solve above technical problems.

SUMMARY

The present invention aims to provide a multifunctional sound device.

In order to achieve above aims, the present invention provides the multifunctional sound device including: a housing, a sound unit, and a motor assembly. The housing includes an accommodating space. The sound unit and the motor assembly are fixedly accommodated in the accommodating space. The sound unit includes a frame, a vibration system, and a magnetic circuit system. The vibration system and the magnetic circuit system are respectively fixed on the frame. The magnetic circuit system includes a magnetic gap. The vibration system includes a vibrating diaphragm and a voice coil. The vibrating diaphragm is fixed to the frame. The voice coil is configured to drive the vibrating diaphragm to sound. The voice coil is inserted into the magnetic gap to drive the vibrating diaphragm to vibrate and generate sound along a first direction. The sound unit further includes a first elastic component. The first elastic component suspends the magnetic circuit system in the accommodating space. A first end of the first elastic component is fixed to the frame. A second end of the first elastic component is elastically connected to the magnetic circuit system. The voice coil is inserted into the magnetic gap to drive the magnetic circuit system to vibrate along the first direction, so as to drive the sound unit to vibrate along the first direction. The magnetic circuit system is recessed along the first direction to from a mounting groove. The motor assembly includes a stator and second elastic components. The stator is accommodated in the mounting groove. The second elastic components suspend the sound unit in the accommodating space. The stator is fixed to the housing. The stator is spaced apart from the magnetic circuit system and drives the magnetic circuit system to vibrate along a second direction, so as to drive the sound unit to vibrate along the second direction. The first direction and the second direction are perpendicular to each other.

Optionally, the magnetic circuit system includes a magnetic yoke, a main magnetic circuit, an auxiliary magnetic circuit, and a top magnet. The main magnetic circuit is fixed to the magnetic yoke. The auxiliary magnetic circuit surrounds the main magnetic circuit and is spaced apart from the main magnetic circuit to form the magnetic gap. The top magnet is stacked on and fixed to one side, close to the vibration system, of the main magnetic circuit. The magnetic yoke is spaced apart from the housing and is located on one side, away from the vibration system, of the magnetic circuit system. The second end of the first elastic component is elastically connected to the magnetic yoke. A magnetic yoke center hole is defined in a center of the magnetic yoke. The magnetic yoke center hole penetrates the magnetic yoke. The main magnetic circuit is annular and defines a guide space. The main magnetic circuit is disposed around the magnetic yoke center hole. The guide space is communicated with the magnetic yoke center hole. The top magnet completely covers the guide space. The main magnetic circuit, the top magnet, and the magnetic yoke enclose to define the mounting groove.

Optionally, the vibrating diaphragm is annular. The vibrating diaphragm is disposed around the top magnet. An outer side of the vibrating diaphragm is fixed to the frame. An inner side of the vibrating diaphragm is fixed to the main magnetic circuit and/or the top magnet.

Optionally, the main magnetic circuit includes a first main magnet, a main pole core, and a second main magnet. The first main magnet is annular and is fixed to the magnetic yoke. The main pole core is annular and is stacked on and fixed to the first main magnet. The second main magnet is annular and is stacked on and fixed to the main pole core. The auxiliary magnetic circuit includes an auxiliary magnet and an auxiliary pole core. The auxiliary magnet is annular and is fixed to the magnetic yoke. The auxiliary pole core is annular and is stacked on and fixed to the auxiliary magnet. The auxiliary pole core and the main pole core are spaced apart to form the magnetic gap.

Optionally, a magnetizing direction of the first main magnet, a magnetizing direction of the second main magnet, a magnetizing direction of the auxiliary magnet, and a magnetizing direction of the top magnet are all along the first direction. The magnetizing direction of the first main magnet is opposite to the magnetizing direction of the second main magnet and the magnetizing direction of the auxiliary magnet. A magnetic pole of one side, close to the main pole core, of the first main magnet is same as a magnetic pole of one side, close to the main pole core, of the second main magnet. The magnetic pole of the one side, close to the main pole core, of the first main magnet is opposite to a magnetic pole of one side, close to the auxiliary pole core, of the auxiliary magnet.

Optionally, the top magnet is of a multi-pole magnetizing structure including a plurality of magnetizing directions. One of the plurality of magnetizing directions is opposite to an adjacent magnetizing direction of the plurality of magnetizing directions along the second direction. A magnetic pole of one side, close to the second main magnet, of the top magnet is opposite to a magnetic pole of one side, close to the top magnet, of the second main magnet.

Optionally, the first elastic component includes a first section, a second section, a third section, and elastic arms. The first section is fixed to the frame. The second section is bent and extends from the first section to the magnetic yoke. The third section is fixed to the magnetic yoke. The elastic arms elastically connect the second section with the third section. A first end of each of the second elastic components is fixed to the housing. A second end of each of the second elastic components is fixed to the first section.

Optionally, the sound unit is rectangular. There are two second elastic components. The two second elastic components are respectively located on two opposite short sides of the sound unit.

Optionally, the stator includes an iron core and a coil. The iron core is fixed to the housing. The coil is wound on the iron core. The iron core is fixed to the housing and is at least partially accommodated in the guide space after passing through the magnetic yoke center hole. The coil is spaced apart from the main magnetic circuit and the top magnet and drive the magnetic circuit system to vibrate along the second direction, so as to drive the sound unit to vibrate along the second direction.

Optionally, the vibration system further includes a support frame and elastic supporting components. The support frame is fixed to the vibrating diaphragm. The elastic supporting components are spaced apart from the vibrating diaphragm. The voice coil is suspended in the magnetic gap through the support frame. A first end of each of the elastic supporting components is fixed to the frame. A second end of each of the elastic supporting components is fixed to the support frame.

Compared with the prior art, the multifunctional sound device includes the mounting groove. The mounting groove is formed in a center position of the magnetic circuit system, and since there are few magnetic field lines in the center position of the magnetic circuit system, after the mounting groove is formed in the center position of the magnetic circuit system, a magnetic energy product utilization rate of the magnetic circuit system is increased, and acoustic performance of the multifunctional sound device is excellent. The motor assembly is accommodated in the mounting groove, so that an overall thickness of the multifunctional sound device is small, which makes the multifunctional sound device light and thin. The sound unit includes the first elastic component. The first end of the first elastic component is fixed to the frame. The second end of the first elastic component is elastically connected to the magnetic circuit system. The voice coil is inserted into the magnetic gap to drive the magnetic circuit system to vibrate along the first direction, so as to drive the sound unit to vibrate along the first direction. The motor assembly includes the stator and the second elastic components. The stator is accommodated in the mounting groove. The second elastic components suspend the sound unit in the accommodating space. The stator is fixed to the one side, away from the vibration system, of the housing. The stator is spaced apart from the magnetic circuit system and drives the magnetic circuit system to vibrate, so as to drive the sound unit to vibrate along the second direction. The multifunctional sound device is enabled to vibrate along the first direction and vibrate along the second direction. Furthermore, the first direction and the second direction are perpendicular to each other. When the motor assembly drives the sound unit to vibrate along the second direction, the stator of the motor assembly has little influence on a driving force of the magnetic circuit system of the sound unit along the first direction, and mutual interference is small. When the voice coil drives the sound unit to vibrate along the first direction, the magnetic circuit system is reused, so that the multifunctional sound device is small in size, excellent in the acoustic performance, and excellent in vibration performance.

BRIEF DESCRIPTION OF DRAWINGS

In order to more clearly illustrate technical solutions in embodiments of the present invention, drawings required in description of the embodiments are briefly described below. Obviously, the drawings in the following description are merely some embodiments of the present invention. For a person of ordinary skill in art, other drawings may be obtained according to the drawings without creative efforts.

DETAILED DESCRIPTION

Figure 1:
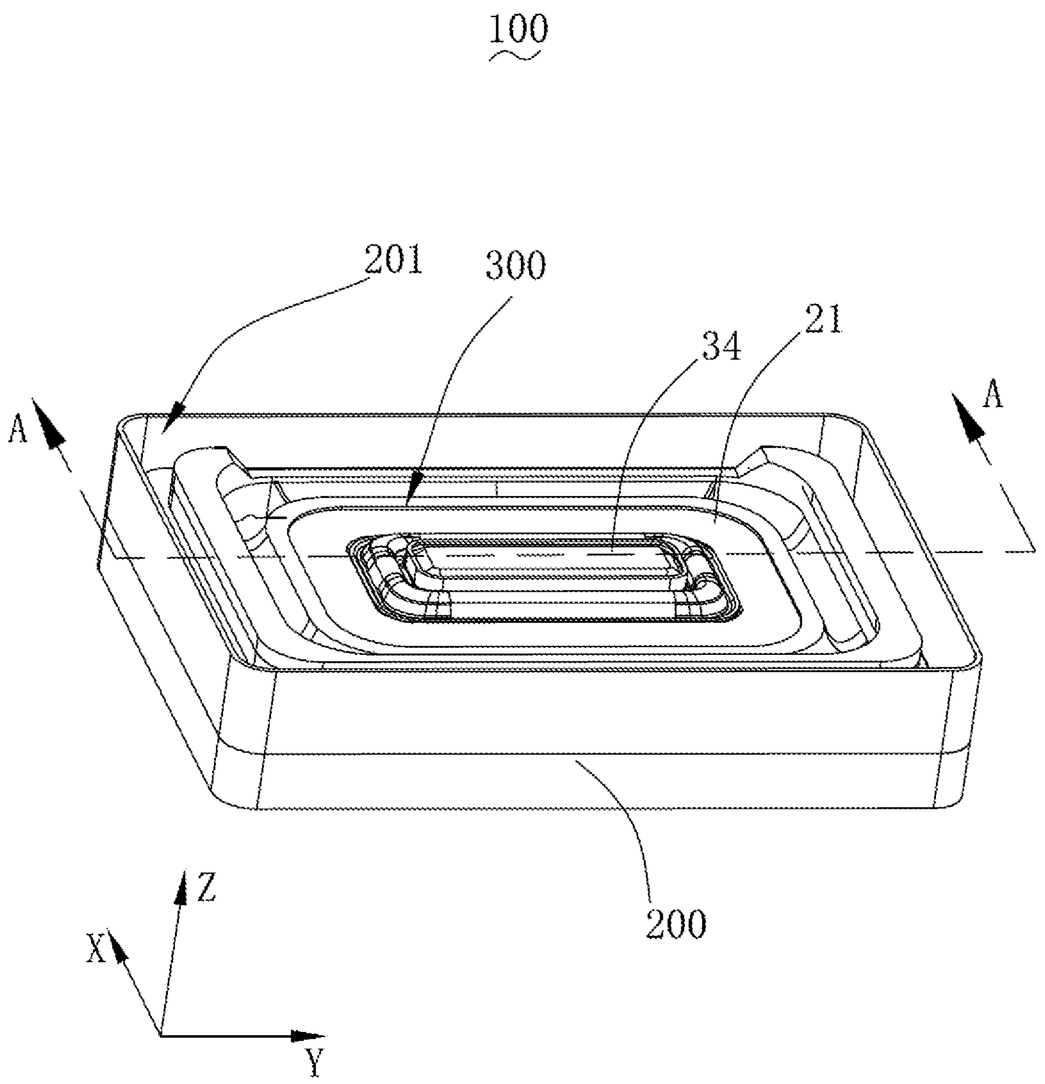
FIG. 1 is a perspective schematic diagram of a multifunctional sound device according to one embodiment of the present invention.
Figure 2:
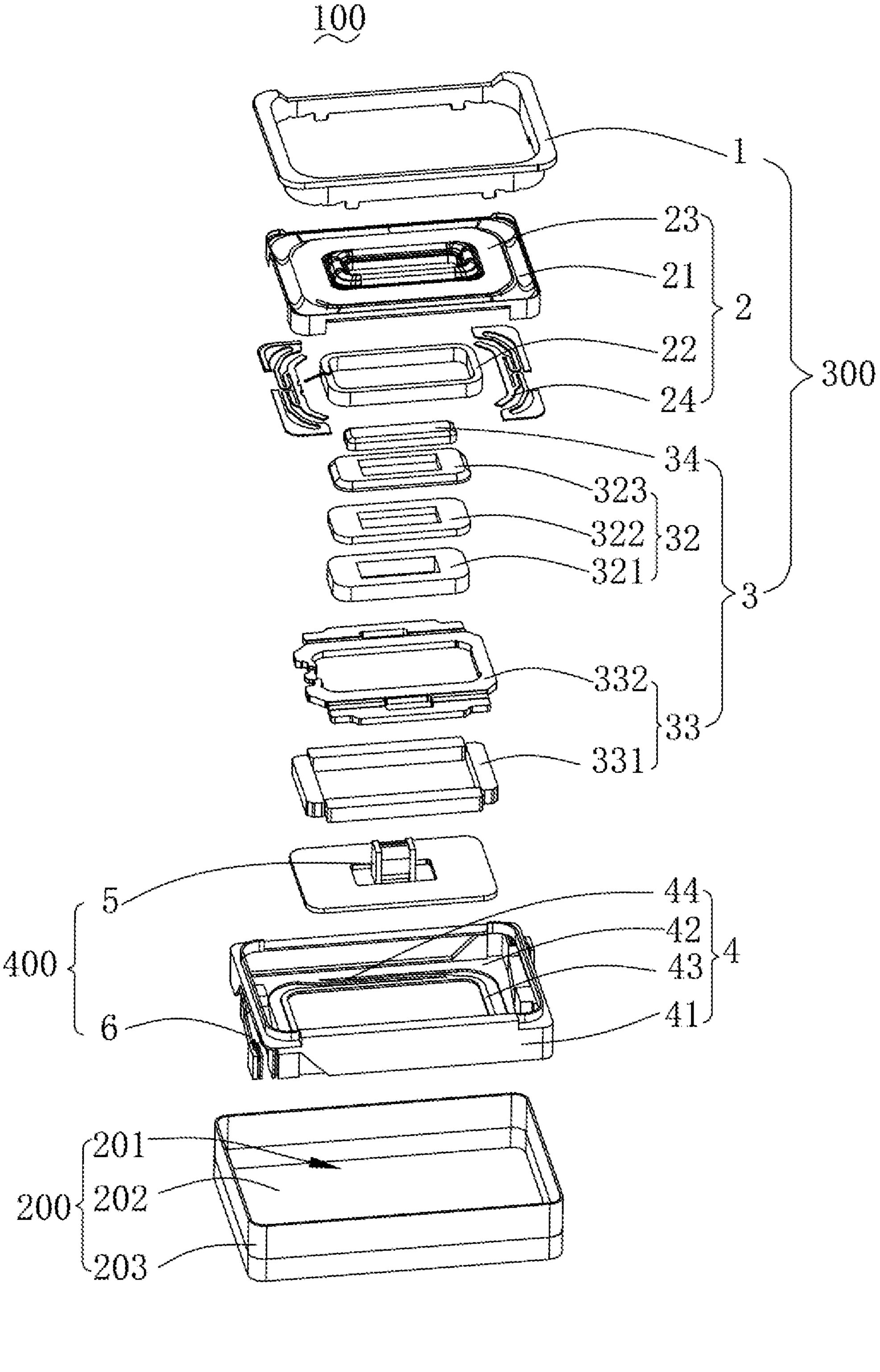
FIG. 2 is an exploded perspective schematic diagram of parts of the multifunctional sound device according to one embodiment of the present invention.
Figure 3:
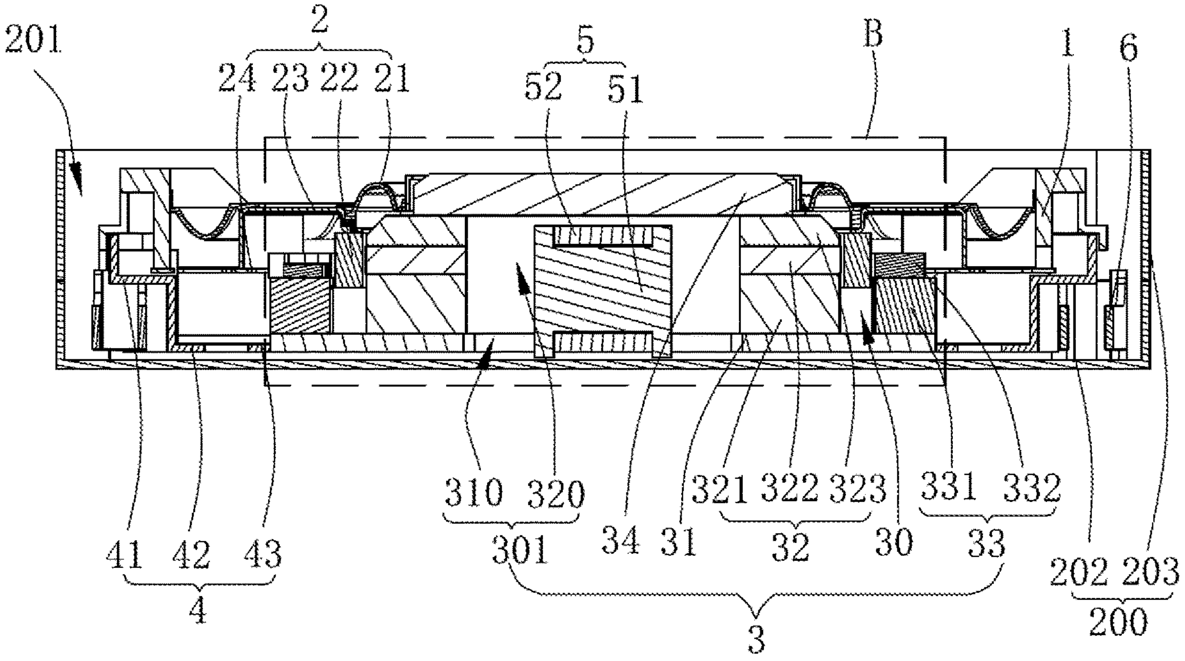
FIG. 3 is a cross-sectional schematic diagram taken along the line A-A shown in FIG. 1.

Technical solutions in embodiments of the present invention are clearly and completely described below with reference to accompanying drawings in the embodiments of the present invention. Obviously, the described embodiments are only a part of the embodiments of the present invention, not all of the embodiments. Based on the embodiments of the present invention, all other embodiments obtained by a person of ordinary skill in art without creative efforts shall fall within a protection scope of the present invention.

Referring to FIGS. 1-5, the present invention provides a multifunctional sound device 100.

Specifically, the multifunctional sound device 100 includes a housing 200, a sound unit 300, and a motor assembly 400. The housing 200 defines an accommodating space 201. The sound unit 300 and the motor assembly 400 are fixedly accommodated in the accommodating space 201.

The housing 200 includes a bottom wall 202 and a side wall 203. The side wall 203 is bent and extends from a periphery of the bottom wall 202. The bottom wall 202 and the side wall 203 together enclose the accommodating space 201. Certainly, the housing 200 may be integrally formed.

The sound unit 300 includes a frame 1, a vibration system 2, a magnetic circuit system 3, and a first elastic component 4. The vibration system 2 and the magnetic circuit system 3 are respectively fixed on the frame 1. The magnetic circuit system 3 includes a magnetic gap 30. The first elastic component 4 suspends the magnetic circuit system 3 in the accommodating space 201.

The magnetic circuit system 3 drives the vibration system 2 to vibrate and generate sound along a first direction. In the embodiment, the first direction Z is a thickness direction of the sound unit 300.

The vibration system 2 includes a vibrating diaphragm 21, a voice coil 22, a support frame 23, and elastic supporting components 24. The vibrating diaphragm 21 is fixed to the frame 1. The voice coil 22 is configured to drive the vibrating diaphragm 21 to sound. The support frame 23 is fixed to the vibrating diaphragm 21. The elastic supporting components 24 are spaced apart from the vibrating diaphragm 21.

The voice coil 22 is inserted into the magnetic gap 30 to drive the vibrating diaphragm 21 to vibrate and generate sound along the first direction Z. The elastic supporting components 24 are directly fixed to the voice coil 22.

By arrangements of the elastic supporting components 24, the voice coil 22 is prevented from horizontally vibrating during vibration, thereby ensuring good stability of the multifunctional sound device 100. Of course, arrangements of the elastic supporting components 24 are not limited as described above, in another embodiment, the elastic supporting components 24 are directly fixed to the voice coil 22.

A first end of each of the elastic supporting components 24 is fixed to the frame 1. A second end of each of the elastic supporting components 24 is fixed to the support frame 23. By the arrangements of the elastic supporting components 24, the voice coil 22 is prevented from horizontally vibrating during vibration, and vibration performance of the voice coil 22 is improved, thereby ensuring the good stability of the multifunctional sound device 100. The elastic supporting components 24 are flexible circuit boards and are configured to supply power to the voice coil 22 and prevent lead of the voice coil 22 from being disconnected, so that the multifunctional sound device 100 is good in stability.

In the embodiment, the sound unit 300 is rectangular. There are two elastic supporting components. The two elastic supporting components 24 are respectively located on two opposite short sides of the magnetic circuit system 3.

In the embodiment, the support frame 23 is made of metal materials, which is configured to realize rigid connection between a dome of the vibrating diaphragm 21 and the voice coil 22.

The magnetic circuit system 3 drives the vibration system 2 to vibrate and generate sound. The magnetic circuit system 3 is recessed along the first direction Z to define a mounting groove 301. In the embodiment, the mounting groove 301 is formed in a center position of the magnetic circuit system 3. The motor assembly 400 is accommodated in the mounting groove 301. Since there are few magnetic field lines in the center position of the magnetic circuit system 3, after the mounting groove 301 is formed in the center position of the magnetic circuit system 3, a magnetic energy product utilization rate of the magnetic circuit system 3 is increased, making acoustic performance of the multifunctional sound device 100 excellent.

The magnetic circuit system 3 includes a magnetic yoke 31, a main magnetic circuit 32, an auxiliary magnetic circuit 33, and a top magnet 34.

The magnetic yoke 31 is spaced apart from the housing 200 and is located on one side, away from the vibration system 2, of the magnetic circuit system 3. A magnetic yoke center hole 310 is defined in a center of the magnetic yoke 31. The magnetic yoke center hole 310 penetrates the magnetic yoke 31. The magnetic yoke center hole 310 is communicated with the accommodating space 201.

The main magnetic circuit 32 is fixed to the magnetic yoke 31 and is disposed around the magnetic yoke center hole 310.

The main magnetic circuit 32 is annular and defines a guide space 320. The guide space 320 is communicated with the magnetic yoke center hole 310. The main magnetic circuit 32 that is annular increases a space of the magnetic gap 30 of the magnetic circuit system 3 and improves the acoustic performance of the multifunctional sound device 100. The guide space 320 is communicated with the magnetic yoke center hole 310, and the guide space 320 and the magnetic yoke center hole 310 enclose to define the mounting groove 301. The guide space 320 is configured to accommodate the motor assembly 400. By such arrangement, the motor assembly 400 is disposed in the guide space 320, so that an overall thickness of the multifunctional sound device 100 is small, making the multifunctional sound device 100 light and thin.

Specifically, the main magnetic circuit 32 includes a first main magnet 321, a main pole core 322, and a second main magnet 323. The first main magnet 321 is annular and is fixed to the magnetic yoke 31. The main pole core 322 is annular and is stacked on and fixed to the first main magnet 321. The second main magnet 323 is annular and is stacked on and fixed to the main pole core 322.

The auxiliary magnetic circuit 33 is fixed to the magnetic yoke 31.

Specifically, the auxiliary magnetic circuit 33 includes an auxiliary magnet 331 and an auxiliary pole core 332. The auxiliary magnet 331 is annular and is fixed to the magnetic yoke 31. The auxiliary pole core 332 is annular and is stacked on and fixed to the auxiliary magnet 331.

The auxiliary magnetic circuit 33 surrounds the main magnetic circuit 32 and is spaced apart from the main magnetic circuit 32 to form the magnetic gap 30.

The auxiliary pole core 332 and the main pole core 322 are spaced apart to form the magnetic gap 30. In the embodiment, the magnetic yoke 31, the main pole core 322, and the auxiliary pole core 332 are made of strong magnetic conductive materials, which enhance magnetic driving force of the magnetic circuit system 3.

The top magnet 34 is stacked on and fixed to one side, close to the vibration system 2, of the main magnetic circuit 32. The top magnet 34 completely covers the guide space 320. The main magnetic circuit 32, the top magnet 34, and the magnetic yoke 31 enclose to define the mounting groove 301.

In the embodiment, the vibrating diaphragm 21 is annular. The vibrating diaphragm 21 is disposed around the top magnet 34. An outer side of the vibrating diaphragm 21 is fixed to the frame 1. An inner side of the vibrating diaphragm 21 is fixed to the main magnetic circuit 32 and/or the top magnet 34. The vibrating diaphragm 21 is fixed to the magnetic circuit system 3, so that the overall thickness of the multifunctional sound device is small, which facilitates light and thin application of the multifunctional sound device 100.

A first end of the first elastic component 4 is fixed to the frame 1. A second end of the first elastic component 4 is elastically connected to the magnetic circuit system 3.

The voice coil 22 is inserted into the magnetic gap 30 to drive the magnetic circuit system 3 to vibrate along the first direction Z, so as to drive the sound unit 300 to vibrate along the first direction Z.

When the sound unit 300 vibrates in the first direction Z, the magnetic circuit system 3 is suspended in the accommodating space 201 through the first elastic component 4, so that the sound unit 300 is able to vibratee along the first direction Z.

Specifically, the first elastic component 4 includes a first section 41, a second section 42, a third section 43, and elastic arms 44. The first section 41 is fixed to the frame 1. The second section 42 is bent and extends from the first section 41 to the magnetic yoke 31. The third section 43 is fixed to the magnetic yoke 31. The elastic arms 44 elastically connect the second section 42 to the third section 43. A first end of each of second elastic components 6 is fixed to the housing 200. A second end of each of the second elastic components 6 is fixed to the first section 41. Thus, on one hand, the magnetic circuit system 3 is suspended in the accommodating space 201, and on the other hand, the overall thickness of the multifunctional sound device 100 is small, which makes the multifunctional sound device 100 light and thin.

The motor assembly 400 includes a stator 5 and the second elastic components 6. The stator 5 is accommodated in the mounting groove 301. The second elastic components 6 suspend the sound unit 300 in the accommodating space 201.

The stator 5 is fixed to one side, away from the vibration system 2, of the housing 200. The stator 5 is spaced apart from the magnetic circuit system 3 and drives the magnetic circuit system 3 to vibrate along a second direction Y, so as to drive the sound unit 300 to vibrate along the second direction Y.

The first direction Z and the second direction Y are perpendicular to each other. In the embodiment, the sound unit 300 is rectangular, and the frame 1 is rectangular. The second direction Y is a direction of a long axis of the frame 1. In addition, a direction of a short axis of the frame 1 is a third direction X. The third direction X, the first direction Z, and the second direction Y are perpendicular to each other.

The stator 5 includes an iron core 51 and a coil 52. The iron core 51 is fixed to the housing 200. the coil 52 is wound on the iron core 51. The iron core 51 is fixed to the housing 200 and is at least partially accommodated in the guide space 320 after passing through the magnetic yoke center hole 310.

The coil 52 is spaced apart from the main magnetic circuit 32 and the top magnet 34 and drives the magnetic circuit system 3 to vibrate along the second direction Y, so as to drive the sound unit 300 to vibrate along the second direction Y.

In the embodiment, there are two second elastic components 6. The two second elastic components 6 are respectively located on two opposite short sides of the sound unit 300.

Principle of the multifunctional sound device 100 of the present invention that achieves vibration in two directions is as follows:

A magnetizing direction of the first main magnet 321, a magnetizing direction of the second main magnet 323, a magnetizing direction of the auxiliary magnet 331, and a magnetizing direction of the top magnet 34 are all along the first direction Z. The magnetizing direction of the first main magnet 321 is opposite to the magnetizing direction of the second main magnet 323 and the magnetizing direction of the auxiliary magnet 331.

A magnetic pole of one side, close to the main pole core 322, of the first main magnet 321 is same as a magnetic pole of one side, close to the main pole core 322, of the second main magnet 323.

The magnetic pole of the one side, close to the main pole core 322, of the first main magnet 321 is opposite to a magnetic pole of one side, close to the auxiliary pole core 332, of the auxiliary magnet 331.

The top magnet 34 is of a multi-pole magnetizing structure including a plurality of magnetizing directions. One of the plurality of magnetizing directions is opposite to an adjacent magnetizing direction of the plurality of magnetizing directions along the second direction Y.

A magnetic pole of one side, close to the second main magnet 323, of the top magnet 34 is opposite to a magnetic pole of one side, close to the top magnet 34, of the second main magnet 323.

Figure 4:
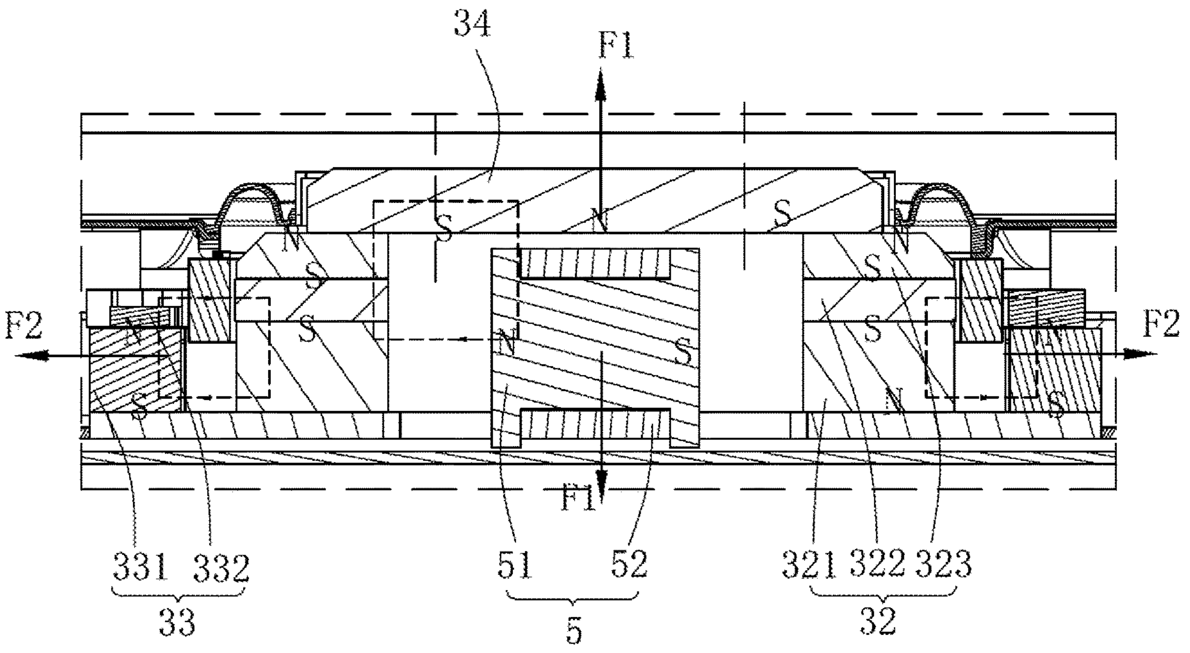
FIG. 4 is an enlarged schematic diagram of the portion B shown in FIG. 3.
Figure 5:
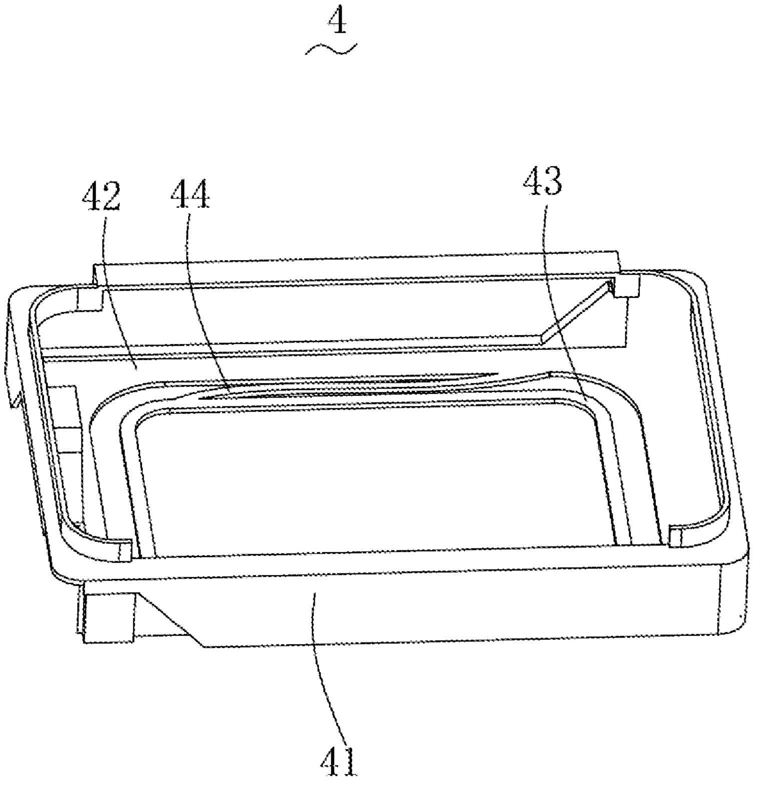
FIG. 5 is a perspective schematic diagram of a first elastic component of the multifunctional sound device according to one embodiment of the present invention.

Referring to FIG. 4, in the embodiment, the magnetic pole of the one side, close to the main pole core 322, of the first main magnet 321 is an S pole. The magnetic pole of the one side, away from the main pole core 322, of the first main magnet 321 is an N pole. The magnetic pole of the one side, close to the main pole core 322, of the second main magnet 323 is the S pole. The magnetic pole of the one side, away from the main pole core 322, of the second main magnet 323 is the N pole. The magnetic pole of the one side, close to the auxiliary pole core 332, of the auxiliary magnet 331 is the N pole. A magnetic pole of one side, away from the auxiliary pole core 332, of the auxiliary magnet 331 is the S pole. The magnetic pole of the one side, close to the second main magnet 323, of the top magnet 34, is the S pole.

Magnetic field lines of the first main magnet 321 sequentially pass through the magnetic yoke 31, the auxiliary magnet 331, the auxiliary pole core 332, the main pole core 322, and the first main magnet 321 to form a magnetic loop. When the voice coil 22 is energized, a driving force F1 along the first direction Z is formed to reciprocate the magnetic circuit system 3 to vibrate along the first direction Z.

When the coil 52 is energized, the iron core 51 is polarized along the second direction Y to have the N pole and the S pole. The polarized iron core 51 interacts with magnetic poles of two ends of the top magnet 34 adjacent to the iron core 51 in to form a suction force and a repulsive force, and directions of the suction force and the repulsive force are consistent to form a driving force F2 along the second direction Y. The driving force F2 along the second direction Y reciprocates the sound unit 300 to vibrate along the second direction Y.

The vibrating diaphragm 21 of the sound unit 300 has a rigidity K1. The rigidity K1 is configured to provide elastic support for the voice coil 22 to form the vibration system 2 for vibrating and generating sound, and the vibration system 2 has a frequency F01.

The first elastic component 4 has a rigidity KZ along the first direction Z and provides the elastic support for the magnetic circuit system 3, so as to form a Z-direction vibration system reciprocating the multifunctional sound device 100 to vibrate along the first direction Z, and the Z-direction vibration system has a frequency F0*z*.

The second elastic components 6 provide a rigidity Ky along the second direction Y, and provides a support for the whole sound unit 300, resulting in forming a Y-direction vibration system for reciprocating vibration of the multifunctional sound device 100 along the second direction Y, and the Y-direction vibration system has a frequency F0*y*.

For the magnetic circuit system 3 and the voice coil 22, the voice coil 22 is energized under a magnetic field of the magnetic circuit system 3 to generate the driving force F1. A direction of the driving force F1 alternatively changes along the first direction Z, but a magnitude of the driving force F1 is constant.

The driving force F2 formed by the coil 52 acts on the whole of the sound unit 300. When a working frequency of the driving force F2 is close to the frequency F0*y*, the Y-direction system resonates in the second direction Y, resulting in forming a Y-direction vibration system for reciprocating the multifunctional sound device 100 to vibrate along the second direction Y to form a Y-axis motor.

When a working frequency of the driving force F1 is close to the frequency F01, the vibrating diaphragm 21 and the voice coil 22 of the vibration system 2 resonate along the first direction Z. That is, the sound unit 300 vibrates and generate sound to work as a speaker.

When the working frequency of the driving force F1 is close to the frequency F0*z*, the magnetic circuit system 3 resonates along the first direction Z, reciprocating the multifunctional sound device 100 to vibrate along the first direction Z to form a Z-axis motor.

The working frequency of the sound unit 300 is generally high, and the working frequency of the motor assembly 400 is low, that is, the frequency F01 is far greater than the frequency F0*z*, so that a risk of mutual interference between the sound unit 300 and the motor assembly 400 is avoided.

Compared with the prior art, the multifunctional sound device includes the mounting groove. The mounting groove is formed in the center position of the magnetic circuit system, and since there are few magnetic field lines in the center position of the magnetic circuit system, after the mounting groove is formed in the center position of the magnetic circuit system, a magnetic energy product utilization rate of the magnetic circuit system is increased, and the acoustic performance of the multifunctional sound device is excellent. The motor assembly is accommodated in the mounting groove, so that the overall thickness of the multifunctional sound device is small, which makes the multifunctional sound device light and thin. The sound unit includes the first elastic component. The first end of the first elastic component is fixed to the frame. The second end of the first elastic component is elastically connected to the magnetic circuit system. The voice coil is inserted into the magnetic gap to drive the magnetic circuit system to vibrate along the first direction, so as to drive the sound unit to vibrate along the first direction. The motor assembly includes the stator and the second elastic components. The stator is accommodated in the mounting groove. The second elastic components suspend the sound unit in the accommodating space. The stator is fixed to the one side, away from the vibration system, of the housing. The stator is spaced apart from the magnetic circuit system and drives the magnetic circuit system to vibrate, so as to drive the sound unit to vibrate along the second direction. The multifunctional sound device is enabled to vibrate along the first direction and vibrate along the second direction. Furthermore, the first direction and the second direction are perpendicular to each other. When the motor assembly drives the sound unit to vibrate along the second direction, the stator of the motor assembly has little influence on the driving force of the magnetic circuit system of the sound unit along the first direction, and mutual interference is small. When the voice coil drives the sound unit to vibrate along the first direction, the magnetic circuit system is reused, so that the multifunctional sound device is small in size, excellent in the acoustic performance, and excellent in vibration performance.

The above are only the embodiments of the present invention. It should be noted that, for the person of ordinary skill in the art, improvements are made without departing from concepts of the present invention, but these are all within the protection scope of the present invention.

What is claimed is:

1. A multifunctional sound device, comprising:

a housing;

a sound unit; and a motor assembly;

wherein the housing comprises an accommodating space; the sound unit and the motor assembly are fixedly accommodated in the accommodating space; the sound unit comprises a frame, a vibration system, and a magnetic circuit system; the vibration system and the magnetic circuit system are respectively fixed on the frame; the magnetic circuit system defines a magnetic gap; the vibration system comprises a vibrating diaphragm and a voice coil; the vibrating diaphragm is fixed to the frame; the voice coil is configured to drive the vibrating diaphragm to sound; and the voice coil is inserted into the magnetic gap to drive the vibrating diaphragm to vibrate and generate sound along a first direction;

the sound unit further comprises a first elastic component; the first elastic component suspends the magnetic circuit system in the accommodating space; a first end of the first elastic component is fixed to the frame; a second end of the first elastic component is elastically connected to the magnetic circuit system; the voice coil is inserted into the magnetic gap to drive the magnetic circuit system to vibrate along the first direction, so as to drive the sound unit to vibrate along the first direction; and the magnetic circuit system is recessed along the first direction to from a mounting groove; the motor assembly comprises a stator and second elastic components; the stator is accommodated in the mounting groove; the second elastic components suspend the sound unit in the accommodating space; the stator is fixed to the housing; the stator is spaced apart from the magnetic circuit system and drives the magnetic circuit system to vibrate along a second direction, so as to drive the sound unit to vibrate along the second direction; the first direction and the second direction are perpendicular to each other.

2. The multifunctional sound device according to claim 1, wherein the magnetic circuit system comprises a magnetic yoke, a main magnetic circuit, an auxiliary magnetic circuit, and a top magnet; the main magnetic circuit is fixed to the magnetic yoke; the auxiliary magnetic circuit surrounds the main magnetic circuit and is spaced apart from the main magnetic circuit to form the magnetic gap, and the top magnet is stacked on and fixed to one side, close to the vibration system, of the main magnetic circuit;

the magnetic yoke is spaced apart from the housing and is located on one side, away from the vibration system, of the magnetic circuit system; the second end of the first elastic component is elastically connected to the magnetic yoke; a magnetic yoke center hole is defined in a center of the magnetic yoke, and the magnetic yoke center hole penetrates the magnetic yoke; and the main magnetic circuit is annular and defines a guide space; the main magnetic circuit is disposed around the magnetic yoke center hole; the guide space is communicated with the magnetic yoke center hole; the top magnet completely covers the guide space; the main magnetic circuit, the top magnet, and the magnetic yoke enclose to define the mounting groove.

3. The multifunctional sound device according to claim 2, wherein the vibrating diaphragm is annular; the vibrating diaphragm is disposed around the top magnet; an outer side of the vibrating diaphragm is fixed to the frame, and an inner side of the vibrating diaphragm is fixed to the main magnetic circuit and/or the top magnet.

4. The multifunctional sound device according to claim 2, wherein the main magnetic circuit comprises a first main magnet, a main pole core, and a second main magnet; the first main magnet is annular and is fixed to the magnetic yoke; the main pole core is annular and is stacked on and fixed to the first main magnet; the second main magnet is annular and is stacked on and fixed to the main pole core; the auxiliary magnetic circuit comprises an auxiliary magnet and an auxiliary pole core; the auxiliary magnet is annular and is fixed to the magnetic yoke; the auxiliary pole core is annular and is stacked on and fixed to the auxiliary magnet; the auxiliary pole core and the main pole core are spaced apart to form the magnetic gap.

5. The multifunctional sound device according to claim 4, wherein a magnetizing direction of the first main magnet, a magnetizing direction of the second main magnet, a magnetizing direction of the auxiliary magnet, and a magnetizing direction of the top magnet are along the first direction; the magnetizing direction of the first main magnet is opposite to the magnetizing direction of the second main magnet and the magnetizing direction of the auxiliary magnet; a magnetic pole of one side, close to the main pole core, of the first main magnet is same as a magnetic pole of one side, close to the main pole core, of the second main magnet; the magnetic pole of the one side, close to the main pole core, of the first main magnet is opposite to a magnetic pole of one side, close to the auxiliary pole core, of the auxiliary magnet.

6. The multifunctional sound device according to claim 5, wherein the top magnet is a multi-pole magnetizing structure having a plurality of magnetizing directions; one of the plurality of magnetizing directions is opposite to an adjacent magnetizing direction of the plurality of magnetizing directions along the second direction; a magnetic pole of one side, close to the second main magnet, of the top magnet is opposite to a magnetic pole of one side, close to the top magnet, of the second main magnet.

7. The multifunctional sound device according to claim 2, wherein the first elastic component comprises a first section, a second section, a third section, and elastic arms; the first section is fixed to the frame; the second section is bent and extends from the first section to the magnetic yoke; the third section is fixed to the magnetic yoke; the elastic arms elastically connect the second section with the third section; a first end of each of the second elastic components is fixed to the housing, and a second end of each of the second elastic components is fixed to the first section.

8. The multifunctional sound device according to claim 1, wherein the sound unit is rectangular, there are two second elastic components; and the two second elastic components are respectively located on two opposite short sides of the sound unit.

9. The multifunctional sound device according to claim 2, wherein the stator comprises an iron core and a coil; the iron core is fixed to the housing; the coil is wound on the iron core, the iron core is fixed to the housing and is at least partially accommodated in the guide space after passing through the magnetic yoke center hole; the coil is spaced apart from the main magnetic circuit and the top magnet and drive the magnetic circuit system to vibrate along the second direction, so as to drive the sound unit to vibrate along the second direction.

10. The multifunctional sound device according to claim 1, wherein the vibration system further comprises a support frame and elastic supporting components; the support frame is fixed to the vibrating diaphragm; the elastic supporting components are spaced apart from the vibrating diaphragm; the voice coil is suspended in the magnetic gap through the support frame; a first end of each of the elastic supporting components is fixed to the frame, and a second end of each of the elastic supporting components is fixed to the support frame.

* * * * *